INVENTORS
DONALD H. BAIRD
CARL F. BUHRER
ATTORNEY

Aug. 31, 1965  D. H. BAIRD ETAL  3,204,104
SINGLE-SIDEBAND LIGHT MODULATOR
Filed July 2, 1962  4 Sheets-Sheet 3
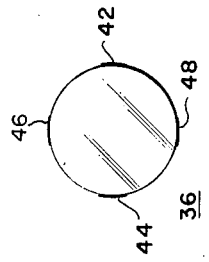
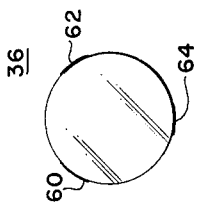
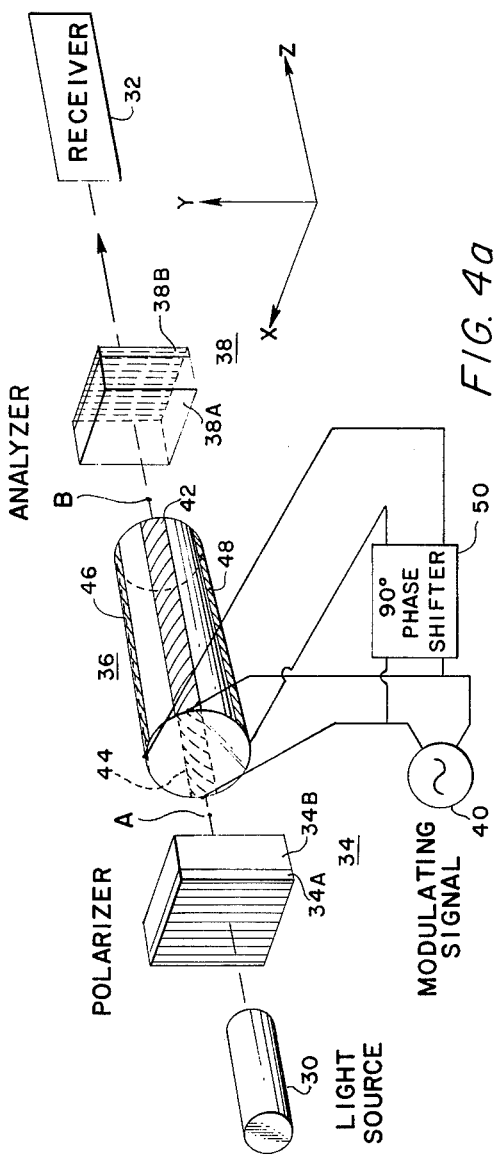
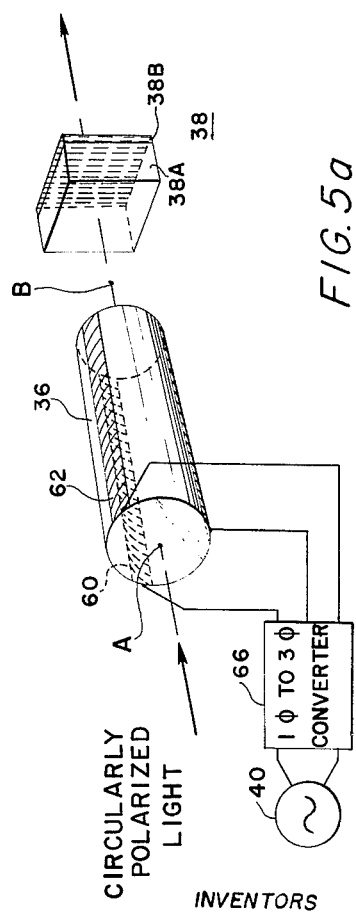
INVENTORS
DONALD H. BAIRD
CARL F. BUHRER
BY R. J. Frank
ATTORNEY Aug. 31, 1965 D. H. BAIRD ETAL 3,204,104
SINGLE-SIDEBAND LIGHT MODULATOR
Filed July 2, 1962 4 Sheets-Sheet 4

INVENTORS
DONALD H. BAIRD
CARL F. BUHRER
BY R. J. Frank
ATTORNEY

United States Patent Office 3,204,104
Patented Aug. 31, 1965

3,204,104
SINGLE-SIDEBAND LIGHT MODULATOR
Donald H. Baird, Great Neck, and Carl F. Buhrer, Hempstead, N.Y., assignors to General Telephone and Electronics Laboratories, Inc., a corporation of Delaware
Filed July 2, 1962, Ser. No. 206,982
20 Claims. (Cl. 250—199)

This invention relates to modulators and in particular to apparatus for producing single-sideband modulation of a light beam.

Optical communications systems using coherent light sources display many advantages over conventional microwave channels. These systems exhibit greater directivity and wider bandwidth and therefore a number of communications links, each transmitting a large number of messages, may operate within sight of each other at nearly the same optical wavelength without interference. Coherent light sources known as optical masers (or lasers) have been developed, but the problems involved in transmitting information by means of a light beam remain significant.

For example, superheterodyne reception is very desirable for optical systems that must operate with noise in the form of background light because a superheterodyne receiver passes only those frequency components of the input noise that fall within the signal and image bands. However, a major problem in obtaining superheterodyne optical reception is the generation of a local oscillator light signal at a frequency differing from the light carrier frequency by the desired intermediate frequency. One way to produce such a signal is to modulate a local laser oscillator with a sinusoidal voltage modulating frequency and use one of the resulting sideband frequencies as the local oscillator signal. This frequency can be varied by varying the modulating frequency. However, the other sideband frequency and the local laser frequency will also mix with the incoming signal, and the spectra of these heterodyne products will overlap the desired spectrum unless the local laser oscillator frequency differs from the transmitter laser frequency by at least twice the signal bandwidth. This difficulty can be avoided by using a single-sideband suppressed-carrier optical modulator to produce the desired sideband frequency. Such a device shifts the frequency of the local laser oscillator without introducing additional frequency components. In addition, a single-sideband suppressed-carrier modulator can be used to transmit information by modulating a light carrier. In this case, the signal is demodulated at the receiver by means of a local oscillator operating at the suppressed carrier frequency.

In copending application Serial No. 196,357, filed May 21, 1962, by Carl F. Buhrer, there is disclosed a single-sideband modulator in which an incident circularly polarized light beam carrier is propagated along a longitudinal axis through first and second axially spaced electro-optic crystals. First and second axial electric fields having the same magnitude and frequency but 90° out of phase are impressed across the first and second crystals respectively. These fields cause an anisotropy to be set up in each crystal such that different polarization directions of the incident light travel through each crystal with velocities that differ by an amount proportional to the magnitudes of the electric fields. As a result, the light which emerges from the second crystal is elliptically polarized having one circularly polarized component rotating at the frequency of the incident light beam and a second circularly polarized component rotating in the opposite direction at a frequency differing from the frequency of the incident light beam by the frequency of the electric fields. Since the carrier and one side-band are present in the light output of the second crystal, single side-band modulation of the incident light carrier is achieved. If it is desired to suppress the carrier frequency, the light may be passed through a circular polarization analyzer which passes only the sideband component.

While modulators of this type are well suited for many applications, they have the limitation that they require a pair of crystals which must be accurately aligned and oriented with respect to the light beam axis. Further, since the electric fields and light path are parallel, the retardation of the polarization direction having minimum light velocity through the crystal with respect to that having maximum velocity is determined solely by the axial voltages that are applied across the crystals and is independent of the crystal dimensions.

Accordingly it is an object of our invention to provide an improved light modulator using a single electro-optic crystal.

It is another object of this invention to provide a single sideband light modulator in which the light retardation is deermined not only by the magnitude of the applied voltage but may also be controlled by proper choice of crystal dimensions.

Yet another object is to provide a single-sideband light modulator in which complete conversion of an input beam to one single sideband frequency can be attained.

Still another object is to provide a highly efficient system for producing single-sideband modulation of light at frequencies up to and including the microwave range.

As is well known, a carrier having a superimposed amplitude modulated signal may be thought of as consisting of a first signal component varying sinusoidally at the carrier frequency, a second signal component varying sinusoidally at the sum of the carrier and modulation frequencies and a third signal component varying sinusoidally at the difference between the carrier and modulation frequency. Expressed mathematically, the instantaneous voltage $$e = E_0 \sin 2\pi f_c t = \frac{mE_0}{2} \cos 2\pi(f_c - f_m)t - \frac{mE_0}{2} \cos 2\pi(f_c + m)t$$

where $E_0$ is the amplitude of the unmodulated wave, $m$ is the degree of modulation expressed as the ratio of the variation in amplitude from the average to the average amplitude, $f_c$ is the carrier frequency in cycles per second, $f_m$ is the modulation frequency in cycles per second and $t$ is time in seconds. In a single-sideband suppressed-carrier modulation system the carrier component sin $2\pi f_c t$ and one of the two sideband components are suppressed. That is, all of the information is conveyed by either the lower sideband component proportional to cos $2\pi(f_c - f_m)t$ or the upper sideband component proportional to cos $2\pi(f_c + f_m)t$. As shall be explained, single-sideband modulation of a light beam may be achieved by transmitting a polarized beam through a single crystal exhibiting a transverse electro-optic effect while impressing a rotating electric field across the crystal in a plane perpendicular to the direction of light propagation.

Electric fields may be employed to change the refractive indices of those non-centrosymmetric crystals which exhibit a linear electro-optic effect. Application of an electric field to a crystal of this type (hereinafter defined as an electro-optic crystal) causes an anisotropy to be set up such that beams (or waves) of electromagnetic radiation with the same direction of propagation but different directions of polarization travel through the crystal with different velocities. In particular, there will be two allowable directions of polarization perpendicular to each other. One is known as the "fast" direction for which the beam velocity is a maximum, the other is known as the "slow" direction for which the velocity of the beam is a minimum. If beams of these two different polarizations start moving through the crystal together, the one with the slow direction of polarization will be shifted in time phase or retarded with respect to the other. The amount of this retardation due to induced birefringence in the crystal is proportional to the field strength as well as the length of the light path of the crystal. In a crystal exhibiting a transverse electro-optic effect, an electric field perpendicular to the direction of light propagation produces the retardation.

In the present invention, a polarized beam of light having a frequency $f_c$ is transmitted through a crystal exhibiting a transverse electro-optic effect and having a 3-fold rotation axis in its point group. In some crystals of this type, the 3-fold rotation axis of the point group coresponds to a 3-fold rotation axis in the crystal; in others it corresponds to a 3-fold screw axis in the crystals. A 3-fold rotation axis may be defined as an axis of symmetry existing in a crystal such that after rotation about the axis through 120° the crystal assumes a congruent position. A crystal with a 3-fold screw axis assumes a congruent position when the 120° rotation is advanced by a translation along the axis of rotation. A point group is one of the 32 crystallographically permissible symmetries involving sets of rotation axes all of which intersect in a common point. Further information on the geometrical features of crystals and the notation used to describe them may be obtained by reference to the textbook "Elementary Crystallography" by M. J. Buerger, published by John Wiley & Sons, Inc., New York, 1956.

The polarized light beam transmitted through the electro-optic crystal is directed through the crystal parallel to a 3-fold symmetry axis. An electric field is rotated about the axis in a plane normal to the axis at an angular velocity corresponding to the modulation frequency $f_m$. When the incident light beam is circularly polarized, the light emerging from the crystal is elliptically polarized and consists of a first circularly polarized component rotating in the same sense as the incident beam and a second circularly polarized component rotating in the opposite sense. The first component rotates with the frequency $f_c$ of the incident beam and the second component rotates at a frequency differing from $f_c$ by $f_m$. The second component may be separated from the first component by a circular polarization analyzer that suppresses the carrier frequency component, the beam emerging from the analyzer having a frequency $f_c+f_m$ or $f_c-f_m$. Whether the frequency is upper sideband, $f_c+f_m$, or lower sideband, $f_c-f_m$, is determined by the sense of rotation of the electric field relative to that of the incident circularly polarized beam. The same objective may also be accomplished with elliptically polarized light incident on the system but in this case the magnitude of the rotating field must be varied to compensate for the eccentricity of the ellipse. (It shall be noted that a circle is a special form of ellipse in which the major and minor axes are equal.)

In one embodiment of our invention circularly polarized light is directed along a 3-fold axis of a transverse electro-optic crystal, i.e. a crystal in which the relative retardation of the two polarizations of the light propagated along the 3-fold axis is proportional to the magnitude of an electric field having a direction perpendicular to the axis. A plurality of electrodes extending in a direction parallel to the 3-fold axis are symmetrically distributed about the axis on the surface of the crystal. In one form of this embodiment first, second, third and fourth electrodes are provided, the first and second electrodes being on opposite sides of the crystal and the third and fourth electrodes being opposite each other and located midway between the first and second electrodes. First and second modulation voltages having the same frequency and amplitude but displaced in phase by 90° are connected to the electrodes, the first voltage being coupled between the first and second electrodes and the second voltage being coupled between the third and fourth electrodes. The first and second modulation voltages produce an electric field which rotates about the 3-fold axis at the frequency $f_m$ of the modulation voltage. If the circularly polarized light entering the crystal is polarized in the direction of rotation of the electric field the light emerging from the crystal has a circularly polarized component rotating at the frequency of the upper sideband. Similarly, if the direction of polarization of the incident light is opposite to the direction of rotation of the electric field, a lower sideband component is produced. In another form of this embodiment of our invention, first, second and third electrodes are symmetrically spaced about the 3-fold rotation axis and a three-phase voltage applied to the three electrodes to produce the rotating transverse electric field.

The embodiment described above is useful for producing single sideband modulation of a light beam at frequencies up to several megacycles. At microwave frequencies, a transmission line surrounding the crystal and energized by two-phase or three-phase voltages may be used, and at still higher frequencies the crystal is placed in a waveguide structure.

The above objects of and the brief introduction to the present invention will be more fully understood and further objects and advantages will become apparent from a study of the following description in connection with the drawings, wherein:

FIGS. 4a and 4b illustrate one embodiment of the invention using a two-phase signal at the modulation frequency to produce the rotating electric field.

FIGS. 5a and 5b show another form of our invention using a three-phase signal.

Figure 1:
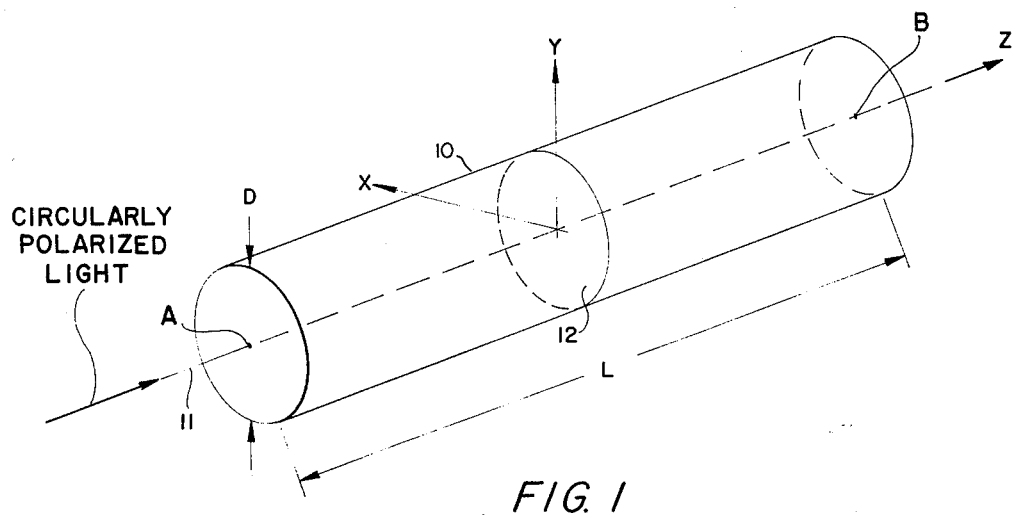
FIG. 1 depicts an electro-optic crystal of the type used in our invention.

FIG. 1 depicts a transverse cylindrical electro-optic crystal 10 having a 3-fold symmetry axis 11 extending in the z direction. Light propagated along the 3-fold axis 11 enters the crystal at A and emerges at B after passing through an imaginary reference plane 12 at $x=0$. Axes $+z$ and $+y$ are shown in plane 12 extending in the directions indicated to form a right-hand system. As has been explained, light propagating in a given direction through the crystal under the influence of an electric field has a velocity which is dependent upon the direction of polarization of the light. The polarization direction for which the light has a maximum velocity (the fast direction) is that in which the refractive index of the crystal is a minimum, and the direction for which the light has minimum velocity (the slow direction) is that in which the refractive index is a maximum. These directions are at right angles to each other and are perpendicular to the direction of light propagation. In general, the refractive indices for waves of the two polarizations may be obtained from an ellipsoidal surface, known as the indicatrix, drawn in the crystal. In particular, the refractive indices for light traveling in a given direction in the crystal may be obtained from the central section (plane $z=0$) of the ellipsoid perpendicular to the light direction.

Figure 2A:
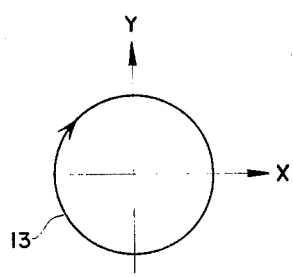
FIGS. 2a–2c illustrate the cross-section of the indicatrix of the crystal for various applied electric fields.

As shown in FIG. 1, a light beam is propagated along a 3-fold axis of crystal 10. When no electric field is applied to the crystal, the central section of the indicatrix in the plane $z=0$ is a circle. This is shown in FIG. 2a where circle 13 is a plot of the central section of the indicatrix in plane 12 looking along the 3-fold axis 11 toward the light source. The circular indicatrix section indicates that the refractive index and therefore the velocity of light along the 3-fold axis is the same for all polarizations in the absence of an electric field.

Figure 2B:
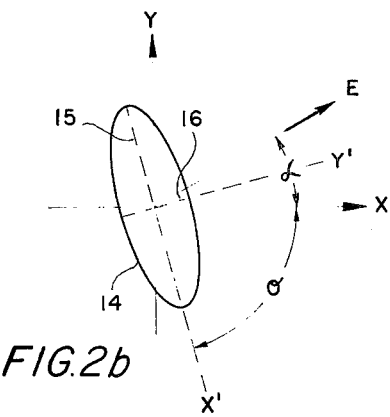

When an electric field E is applied across crystal 10 in a direction perpendicular to the direction of light propagation, the refractive indices for light polarized in the fast and slow directions are altered. This changes the shape of the central section of the indicatrix from a circle to an ellipse 14 (FIG. 2b), the length of the major axis 15 of the ellipse being proportional to the refractive index of crystal 10 with respect to light polarized in the direction $x'$ and the length of the minor axis 16 being proportional to the refractive index with respect to light polarized in the $y'$ direction. These indices of refraction are dependent only on the magnitude of the electric field E and not on its direction. The retardation of light polarized in the $x'$ direction with respect to light polarized in the $y'$ direction is proportional to the magnitude of the electric field and to the length L of crystal 10 in the direction of light propagation. Thus, for a given electric field, the retardation may be increased by increasing the ratio of $L/D$, where D is the diameter of the crystal. The orientation of the ellipse, however, does depend on the direction of the electric field, the angle between the $x$ and $x'$ axes being a function of the angle $\alpha$ the field E makes with the $x$ axis.

Figure 2C:
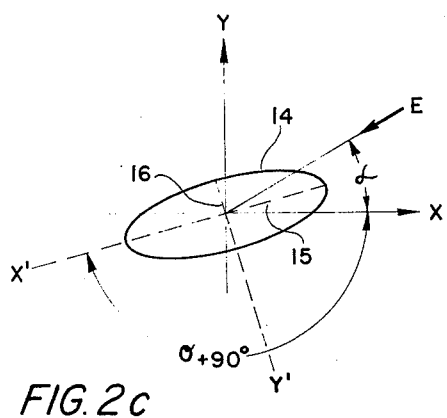

When the direction of the electric field E is reversed, the fast and slow polarization directions are also reversed effectively rotating the major and minor axes 15 and 16 of the ellipse through 90° as shown in FIG. 2c. Thus, it is seen that a 180° reversal in the direction of the electric field produces a 90° rotation in the ellipse. It can be shown that if the electric field E is varied as a function of time, with $\alpha = 2\pi f_m t$, the field rotates around the 3-fold symmetry axis 11 at an angular velocity $2\pi f_m$ and the ellipse 14 rotates about axis 11 in the opposite direction with one-half the angular velocity of the field.

Figure 3:
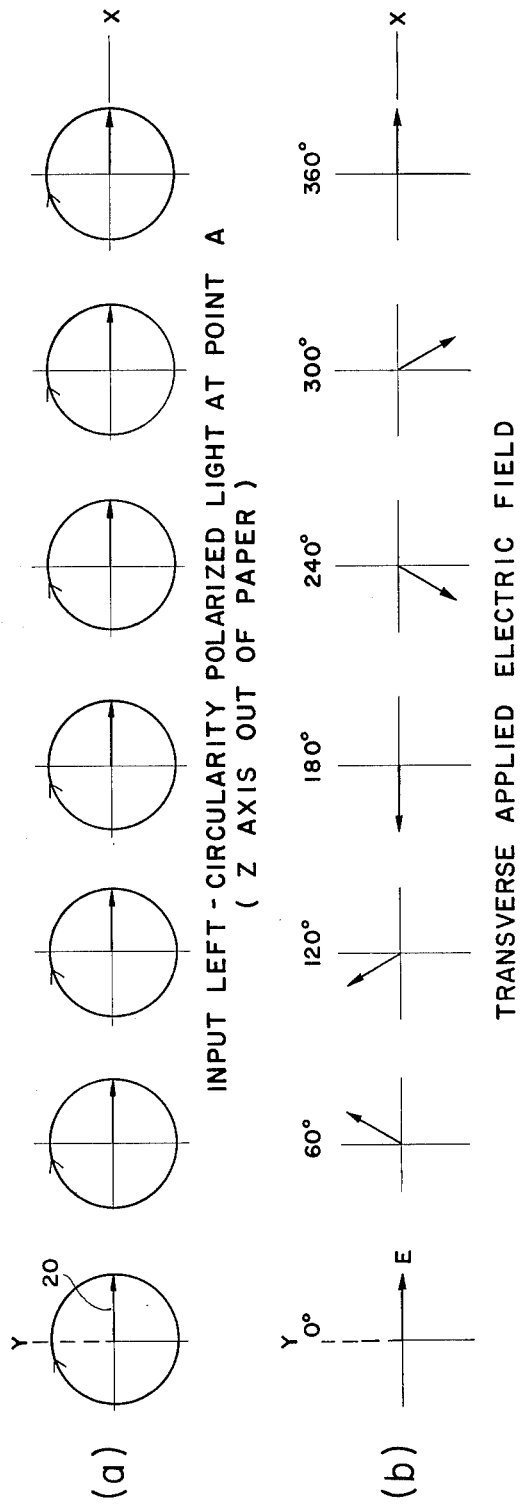
FIGS. 3a–3c are useful in explaining the operation of our light modulator.

FIG. 3 illustrates the operation of the crystal in producing single-sideband modulation of a light carrier having a frequency $f_c$ during one cycle of the modulating signal, i.e. one rotation of the applied transverse electric field E. In FIG. 3a, the rotating vector 20 represents the electric component of the left-circularly polarized light beam incident on the crystal at point A. FIG. 3b illustrates the direction of the constant magnitude electric field E at 60° intervals as it rotates counter-clockwise about the axis 11 during one modulation cycle. For simplicity only, it is assumed that each of the 60° intervals of the modulation cycle corresponds to an integral (and very large) number of cycles of the input light frequency. Thus, the electric vector of the circularly polarized light at point A is directed in the $x$ direction at the start of each 60° interval of the modulation cycle.

At the start of the modulation cycle, the electric field is in the $x$ direction (zero degrees). This field induces a birefringence in the crystal 10 that converts part of the left-circularly polarized light into right-circularly polarized light so that the resulting output light at point B is elliptically polarized as shown in FIG. 3c. As the applied electric field E rotates counter-clockwise (FIG. 3b) the ellipse 22 rotates cockwise at one-half the angular velocity of the vector E. This is evident from FIGS. 3b and 3c which indicate that for a 360° counter-clockwise rotation of the field E, the elipse 22 rotates clockwise through 180°.

The light emerging from the crystal at point B comprises two oppositely rotating components which add vectorially to form the ellipse 22. One is a left-circularly polarized component 24 of a first fixed amplitude rotating in synchronism with the input left-circularly polarized light (FIG. 3a) and the other is a right-circularly polarized component 26 of a second fixed amplitude. Further examination of FIG. 3c shows that the right-circularly polarized component lags one counter-clockwise rotation during the modulation cycle as can be seen by examining the successive orientations of the counter-clockwise rotating vector 26. Thus, each modulation cycle subtracts a cycle from the output right-circularly polarized light, and therefore the frequency of this component is the difference between the frequency $f_c$ of the input light and the modulation frequency $f_m$ i.e., the lower sideband frequency $f_c - f_m$. If the electric field E and the incident light polarization both rotate in the same direction, the upper sideband $f_c + f_m$ is generated.

The amplitudes of the left and right-circularly polarized light components 24 and 26 are functions of the retardation in the crystal. When this retardation is equal to $\pi(2n+1)$ radians, where $n$ is any integer, complete conversion of the incident light to upper or lower sideband takes place.

Crystal 10 may be any crystal containing a 3-fold rotation axis in its point group and which exhibits a transverse linear electro-optic effect upon light traveling along this axis. Crystal classes whose symmetry elements include one or more 3-fold rotation axes occur in the cubic, hexagonal and trigonal systems.

In cubic crystals, the [111] directions are 3-fold rotation axes. Using the symbols employed in the International Tables of X-ray Crystallography published for the International Union of Crystallography by the Kynock Press, Birmingham (England) (1952), cubic crystals belonging to point groups 23 and $\bar{4}3m$ exhibit the desired electro-optic behavior. Cubic crystals are optically isotropic and therefore when no field is applied they are not birefringent for any direction of light propagation.

The other classes of crystals, i.e. point groups, possessing 3-fold rotation axes are uniaxial with the optic axis parallel to the 3-fold axis. These classes comprise the two hexagonal point groups $\bar{6}$ and $\bar{6}m2$, each characterized by a 6-fold inversion axis which includes a 3-fold rotation axis. In addition, all non-centrosymmetric classes of the trigonal system 3, 32 and 3m may be employed.

FIG. 4a is a schematic diagram of one embodiment of our invention used for modulating light at frequencies up to and including the megacycle range. A beam of monochromatic light having a frequency $f_c$ is directed by a light source 30 toward a remote receiver 32. The light beam is circularly polarized by a polarizer 34, modulated at a frequency $f_m$ in crystal 36 and then propagated through a circular polarization anaylzer 38. This apparatus produces single-sideband suppressed-carrier modulation of the light beam at the output of analyzer 38.

Source 30 may be any non-coherent light source such as a sodium vapor lamp. Alternatively, a coherent light source such as an optical maser may be used, a gaseous type suitable for this application being described in detail in copending application Serial No. 200,239, filed June 5, 1962 by Kenneth D. Earley et al. (It shall be noted that if the light emitted by the optical maser is plane polarized, a quarter-wave birefringent plate may be substituted for the circular polarizer 34.)

The light from source 30 is propagated in the $z$ direction through polarizer 34 which consists of a plane polarizer 34a positioned to transmit light with its electric vector oriented in the $y$ direction in the transverse $x-y$ plane and a quarter-wave birefringent plate 34b having its fast polarization direction in the $x-y$ plane in a direction at 45° to the $-x$ and $y$ axes.

Plane polarizer 34a may be made of any material exhibiting dichroism such as tourmaline or Polaroid. The quarter-wave birefringent plate 34b may consist of a thin sheet of split mica or quartz cut parallel to its optic axes and having a thickness which produces a 90° relative phase shift between light components in the $x-y$ plane at $+45°$ and $-45°$ from the $y$ axis. With the described orientation of plane polarizer 34a and birefringent plate 34b, the light at point A is circularly polarized in the left-hand direction; i.e. looking toward polarizer 34 from point A the electric vector of the electromagnetic light wave rotates clockwise as the light is propagated in the z direction.

The left-circularly polarized light at point A is transmitted through the crystal in a direction parallel to the 3-fold axis AB of a cylindrical electro-optic crystal 36 and emerges at point B elliptically polarized. Crystal 36 consists of a cubic zinc sulfide mineral of natural origin belonging to point group $\overline{4}3m$ although any of the electro-optic crystals exhibiting 3-fold symmetry previously discussed may be employed. A modulating source 40 is connected to longitudinally extending electrodes 42 and 44 located on opposite sides of crystal 36 and to longitudinally extending electrodes 46 and 48 (see FIG. 4b) through 90° phase shifter 50. Electrodes 46 and 48 are opposite each other and located midway between electrodes 42 and 44. The two electric fields applied across electrode pairs 42, 44 and 46, 48 produce a total electric field E at the cylinder axis which rotates about the 3-fold symmetry axis in the manner indicated in FIG. 3b. This total field E induces birefringence which interacts with the left-circularly polarized light incident on the crystal producing either an upper or lower sideband component depending upon the direction of rotation of the applied field. If the shift produced by phase shifter 50 is −90°, the electric field E rotates in the same direction as the incident polarized light and the upper sideband is produced; if the phase shift is +90° the field E rotates in the opposite direction and the lower sideband is produced.

By making crystal 36 of sufficient length to produce a retardation of $\pi$ radians (or an odd multiple thereof), with a given field the output light at point B will contain only the sideband component and no carrier. However, if the amplitude of the retardation in the crystal is not equal to $\pi$ radians the carrier may be suppressed by the use of a right-circular analyzer 38. Analyzer 38 consists of a quarter-wave birefringent plate 38a and a plane polarizer 38b, analyzer 38a extracting the desired right-circularly polarized sideband component and blocking the left-circularly polarized carrier component. If the modulation signal is non-sinusoidal, the electric field must be limited to a value producing a retardation of less than $\pi/2$ radians to avoid intermodulation distortion and production of spurious sidebands.

FIGS. 5a and 5b show another form of the invention useful at frequencies up to the megacycle range in which an electro-optic crystal 36 has first, second and third electrodes 60, 62 and 64 spaced symmetrically at 120° intervals about the 3-fold rotation axis AB. A single-to-three phase converter 66 is energized by a single phase modulating signal source 40, converter 66 transforming this single-phase signal to a set of three-phase voltages displaced in time phase by 120°. When these voltages are coupled to electrodes 60, 62 and 64 a rotating electric field is produced in a direction normal to the 3-fold axis. This field produces birefringence which interacts with circularly polarized light incident at point A and propagated along the 3-fold axis to produce a circularly polarized component at the carrier frequency and a sideband component at a frequency differing from the carrier frequency by the modulation frequency at point B. Analyzer 38 suppresses the carrier frequency component and permits the sideband frequency component to be transmitted. Thus, the operation of the modulator with three-phase excitation is the same as with two-phase excitation shown in FIGS. 4a and 4b.

Figure 6:
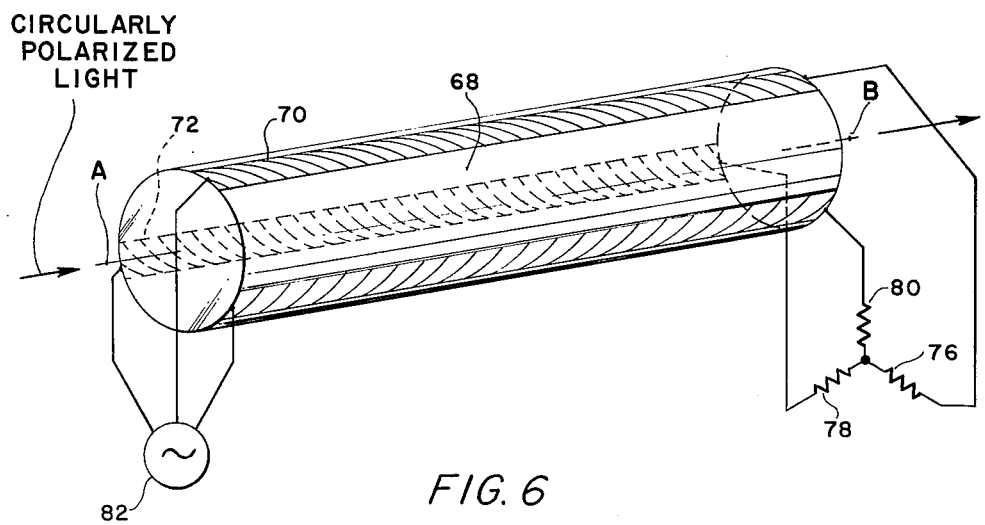
FIG. 6 illustrates an embodiment of the invention useful at microwave frequencies.

FIG. 6 depicts a traveling wave electro-optic cell 68 for modulation frequencies in the microwave range. A three-phase transmission line consisting of electrodes 70, 72 and 74 terminated by impedances 76, 78 and 80 is excited by a three-phase signal source 82. The signal, which is fed in at end A of the line travels along the crystal 68 at the phase velocity of light and is absorbed by the matched termination consisting of impedances 76, 78 and 80. Circularly polarized light entering the crystal at A and traveling along its 3-fold axis emerges at B having a carrier and one sideband frequency component.

Figure 7:
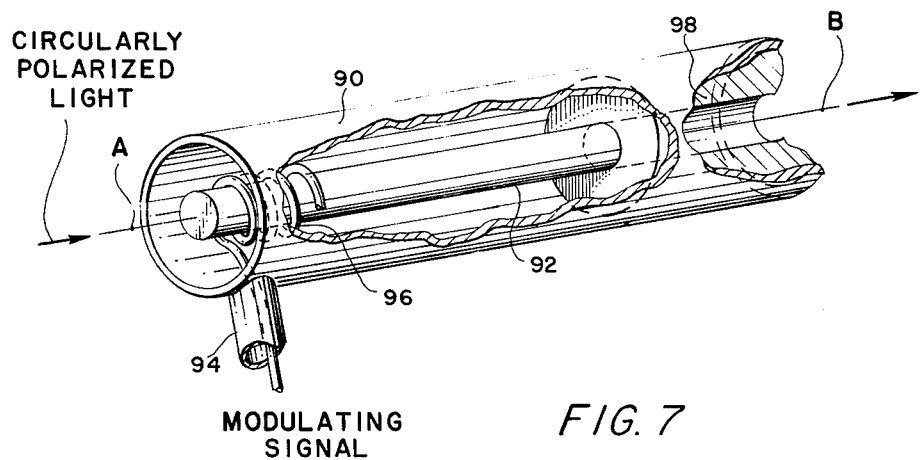
FIG. 7 is another embodiment of the invention useful at still higher microwave frequencies.

At even higher microwave frequencies a waveguide structure with a circularly polarized transverse electric mode may be used to produce the rotating electric field. In FIG. 7 a circular waveguide 90 having a cylindrical electro-optic crystal 92 positioned along its axis is used to produce circularly polarized microwaves which result in a traveling rotating electric field perpendicular to the light beam. The crystal is oriented with its cubic [111], trigonal or hexagonal optic axis (i.e. its 3-fold axis) along the light path. A modulating signal is fed in at 94 (by means of a coupling helix 96) and after passing through the crystal is absorbed by a matched waveguide load consisting of a lossy dielectric material 98. The birefringence induced acts on the circularly polarized light incident at A to produce a sideband component at B. It shall be noted that in the embodiment of the invention shown in FIGS. 6 and 7, the carrier component may be suppressed by use of a circular analyzer as shown in FIGS. 4a and 5a.

As many changes could be made in the above described construction and many different embodiments could be made without departing from the scope thereof, it is intended that all matter contained in the above description or shown in the accompanying drawings shall be interpreted as illustrative and not in a limiting sense.

What is claimed is:
1. Apparatus for modulating an incident polarized beam of electromagnetic radiation comprising
   (a) an electro-optic crystal having a 3-fold rotation axis in its point group, said beam being directed through said crystal parallel to said axis, and
   (b) means for producing an electric field which rotates with respect to said crystal, said electric field rotating about said axis in a plane perpendicular thereto, the beam emerging from said electro-optic crystal having a component at a frequency differing from the frequency of the incident beam by the frequency of rotation of said electric field.

2. Apparatus for modulating an incident polarized beam of electromagnetic radiation comprising
   (a) a cubic electro-optic crystal having a 3-fold rotation axis in its point group, said beam being directed through said crystal parallel to said axis, and
   (b) means for producing a rotating electric field, said electric field being rotated about said axis in a plane perpendicular thereto, the beam emerging from said electro-optic crystal having a component at a frequency differing from the frequency of the incident beam by the frequency of rotation of said electric field.

3. Apparatus for modulating an incident polarized beam of electromagnetic radiation as defined in claim 2 wherein said cubic electro-optic crystal is in point group 23.

4. Apparatus for modulating an incident polarized beam of electromagnetic radiation as defined in claim 2 wherein said cubic electro-optic crystal is in point group $\overline{4}3m$.

5. Apparatus for modulating an incident polarized beam of electromganetic radiation comprising
   (a) a hexagonal electro-optic crystal having a 3-fold rotation axis in its point group, said beam being directed through said crystal parallel to said axis, and
   (b) means for producing a rotating electric field, said electric field being rotated about said axis in a plane perpendicular thereto, the beam emerging from said electro-optic crystal having a component at a frequency differing from the frequency of the incident beam by the frequency of rotation of said electric field.

6. Apparatus for modulating an incident polarized beam of electromagnetic radiation as defined in claim 5 wherein said hexagonal electro-optic crystal is in point group $\bar{6}$.

7. Apparatus for modulating an incident polarized beam of electromagnetic radiation as defined in claim 5 wherein said hexagonal electro-optic crystal is in point group $\bar{6}m2$.

8. Apparatus for modulating an incident polarized beam of electromagnetic radiation comprising
    (a) a trigonal electro-optic crystal having a 3-fold rotation axis in its point group, said beam being directed through said crystal parallel to said axis, and
    (b) means for producing a rotating electric field, said electric field being rotated about said axis in a plane perpendicular thereto, the beam emerging from said electro-optic crystal having a component at a frequency differing from the frequency of the incident beam by the frequency of rotation of said electric field.

9. Apparatus for modulating an incident polarized beam of electromagnetic radiation as defined in claim 8 wherein said trigonal electro-optic crystal is in point group 3.

10. Apparatus for modulating an incident polarized beam of electromagnetic radiation as defined in claim 8 wherein said trigonal electro-optic crystal is in point group 32.

11. Apparatus for modulating an incident polarized beam of electromagnetic radiation as defined in claim 8 wherein said trigonal electro-optic crystal is in point group 3m.

12. Apparatus for modulating an incident elliptically polarized light beam comprising
    (a) a transverse electro-optic crystal having a 3-fold rotation axis in its point group, said beam being directed through said crystal parallel to said axis,
    (b) a plurality of electrodes affixed to the surface of said crystal, said electrodes extending in a direction parallel to the 3-fold rotation axis and being symmetrically disposed thereabout, and
    (c) voltage means coupled to said plurality of electrodes, said voltage means producing an electric field rotating about said axis in a plane perpendicular thereto, the beam emerging from said electro-optic crystal having a frequency differing from the frequency of the incident beam by the frequency of rotation of said electric field.

13. Apparatus for modulating an incident elliptically polarized light beam comprising
    (a) a transverse electro-optic crystal having a 3-fold rotation axis in its point group, said beam being directed through said crystal parallel to said axis,
    (b) first, second, third and fourth electrodes affixed to the surface of said crystal, said first and second electrodes being positioned opposite each other and said third and fourth electrodes being positioned opposite each other, said third and fourth electrodes being located midway between said first and second electrodes, and
    (c) a first voltage source coupled between said first and second electrodes and a second voltage source coupled between said third and fourth electrodes, said first and second voltages having the same frequency and being displaced in phase by 90°, said first and second voltages producing an electric field rotating about said axis in a plane perpendicular thereto, the beam emerging from said electro-optic crystal having a frequency differing from the frequency of the incident beam by the frequency of rotation of said electric field.

14. Apparatus for modulating an incident elliptically polarized light beam comprising
    (a) a transverse electro-optic crystal having a 3-fold rotation axis in its point group, said beam being directed through said crystal parallel to said axis,
    (b) first, second and third electrodes affixed to the surface of said crystals, said electrodes extending in a direction parallel to the 3-fold rotation axis and being symmetrically disposed thereabout, and
    (c) voltage means coupled to said first, second and third electrodes, the voltages applied to said first, second and third electrodes having the same frequency but being displaced in phase by 120°, said voltages producing an electric field rotating about said axis in a plane perpendicular thereto, the beam emerging from said electro-optic crystal having a frequency differing from the frequency of the incident beam by the frequency of rotation of said electric field.

15. Apparatus for modulating an incident elliptically polarized light beam comprising
    (a) a transverse electro-optic crystal having a 3-fold rotation axis in its point group and having first and second ends, said beam being directed through said crystal parallel to said axis from said first end to said second end,
    (b) a plurality of electrodes affixed to the surface of said crystal, said electrodes extending from said first end to said second end of said crystal in a direction parallel to the 3-fold rotation axis and being symmetrically disposed thereabout,
    (c) voltage means coupled to said plurality of electrodes at said first end, and
    (d) terminating means coupled to said plurality of electrodes at said second end, said voltage means producing an electric field rotating about said axis in a plane perpendicular thereto, the beam emerging from said electro-optic crystal having a frequency differing from the frequency of the incident beam by the frequency of rotation of said electric field.

16. Apparatus for modulating an incident elliptically polarized light beam comprising
    (a) a transverse electro-optic crystal having a 3-fold rotation axis in its point group, said beam being directed through said crystal parallel to said axis,
    (b) a waveguide surrounding said electro-optic crystal, and
    (c) means for coupling a modulating signal into said waveguide, an electric field being produced within said waveguide which rotates about said axis in a plane perpendicular thereto, the beam emerging from said electro-optic crystal having a frequency differing from the frequency of the incident beam by the frequency of rotation of said electric field.

17. Apparatus for modulating an incident elliptically polarized light beam comprising
    (a) a transverse electro-optic crystal having a 3-fold rotation axis in its point group and having first and second ends, said beam being directed through said crystal parallel to said axis from said first end to said second end,
    (b) a waveguide surrounding said electro-optic crystal, said waveguide extending beyond the second end of said crystal,
    (c) a coupling helix surrounding the first end of said crystal, said helix coupling a modulating electric field into said waveguide, said field rotating about said axis in a plane perpendicular thereto, and
    (d) terminating means located at the end of said waveguide adjacent the second end of said crystal, the beam emerging from said electro-optic crystal having a frequency differing from the frequency of the incident beam by the frequency of said electric field.

18. Apparatus for producing single-sideband suppressed carrier modulation of an incident circularly polarized light beam having a first direction of rotation comprising
    (a) a transverse electro-optic crystal having a 3-fold rotation axis in its point group, said beam being directed through said crystal parallel to said axis, (b) a plurality of electrodes affixed to the surface of said crystal, said electrodes extending in a direction parallel to the 3-fold rotation axis and being symmetrically disposed thereabout, (c) voltage means coupled to said plurality of electrodes, said voltage means producing an electric field rotating about said axis in a plane perpendicular thereto, the beam emerging from said crystal having a first circularly polarized component rotating in said first direction at the frequency of said incident light beam and a second circularly polarized component rotating in the opposite direction at a frequency differing from the frequency of said incident light beam by the frequency of said modulating voltage, and (d) a circular polarization analyzer axially spaced from said crystal, said analyzer suppressing said first circularly polarized component and transmitting said second circularly polarized component.

19. A light modulator comprising (a) a light source, said source directing a beam of monochromatic light along a beam axis, (b) a light polarizer located adjacent to said source along said beam axis, (c) a transverse cylindrical electro-optic crystal having a 3-fold rotation axis in its point group, said beam being directed through said crystal parallel to said axis, (d) first, second, third and fourth electrodes affixed to the surface of said crystal, said first and second electrodes being positioned opposite each other and said third and fourth electrodes being positioned opposite each other, said third and fourth electrodes being located midway between said first and second electrodes, (e) means for coupling a modulating voltage across said first and second electrodes, (f) means for shifting the phase of said modulation voltage 90° and coupling the phase shifted voltage across said third and fourth electrodes, the light emerging from said crystal having a first circularly polarized component rotating in said first direction at the frequency of said incident light beam and a second circularly polarized component rotating in the opposite direction at a frequency differing from the frequency of said incident light beam by the frequency of said modulating voltage, and (g) a circular polarization analyzer axially spaced from said crystal, said analyzer suppressing said first circularly polarized component and transmitting said second circularly polarized component.

20. A light modulator as defined by claim 19 wherein for a sinusoidal modulating voltage of predetermined amplitude the length of the light path through said crystal produces a retardation of $\pi(2n+1)$ radians, where $n$ is any integer, the first circularly polarized component being suppressed within said crystal, the light emerging from said crystal having a frequency differing from the frequency of said incident light beam by the frequency of said modulating voltage.

References Cited by the Examiner

UNITED STATES PATENTS

| 2,788,710 | 4/57 | West | 88—61 |
|---|---|---|---|
| 2,974,568 | 3/61 | Dillon | 250—199 |

FOREIGN PATENTS 776,129 6/57 Great Britain.

OTHER REFERENCES

Proc. of the IRE, "Standards on Piezoelectric Crystals," 1949, pp. 1378–1395.

DAVID G. REDINBAUGH, *Primary Examiner.*